United States Patent [19]

Takanashi et al.

[11] Patent Number: 5,128,893
[45] Date of Patent: Jul. 7, 1992

[54] ELECTROSTATIC LATENT IMAGE RECORDING/REPRODUCING DEVICE

[75] Inventors: Itsuo Takanashi, Kamakura; Shintaro Nakagaki, Fujisawa; Hirohiko Shinonaga, Yokohama; Masato Furuya, Yokosuka; Tsutou Asakura, Yokohama; Tetsuji Suzuki, Yokosuka, all of Japan

[73] Assignee: Victor Company of Japan, Ltd., Yokohama, Japan

[21] Appl. No.: 498,662

[22] Filed: Mar. 26, 1990

[30] Foreign Application Priority Data

Mar. 30, 1989 [JP] Japan .................................. 1-79770

[51] Int. Cl.⁵ ....................... G11C 11/23; G11B 11/08
[52] U.S. Cl. .................... 365/112; 346/153.1; 369/126
[58] Field of Search ............ 365/112; 358/342; 369/100, 126; 346/153.1, 154

[56] References Cited

U.S. PATENT DOCUMENTS

| | | | |
|---|---|---|---|
| 3,615,388 | 10/1971 | Gundlach | 365/112 |
| 4,296,478 | 10/1981 | Kiess et al. | 365/112 |
| 4,331,976 | 5/1982 | Kinjo et al. | 358/342 |
| 4,392,719 | 7/1983 | Sekimoto | 350/342 |
| 4,786,922 | 11/1988 | Hosoki et al. | 346/153.1 X |
| 4,956,714 | 9/1990 | Takanashi et al. | 358/213.11 |

FOREIGN PATENT DOCUMENTS

| | | |
|---|---|---|
| 305033 | 3/1989 | European Pat. Off. |
| 0327236 | 8/1989 | European Pat. Off. |
| 55-139643 | 10/1980 | Japan |

OTHER PUBLICATIONS

The Illustrated Dictionary of Electronics, 2d Ed., R. P. Turner, p. 604.
Japanese Journal of the Society of Image Electronics, 1979.
SPSE, 1974, "Charge Transfer Electrophotography", R. L. Jepsen and G. F. Day, pp. 28,29 and 33.
"Electric Photography", R. M. Schaffert, 1973.
Japanese Electric Engineering Handbook, p. 583.
Patent Abstracts of Japan, vol. 13, No. 478(P-951) (3826), Oct. 30, 1989; & JP-A-1 189046 (Victor Company of Japan, LTD.) 28-07-1989.
Patent Abstracts of Japan, vol. 9, No. 156 (P-368) (1879), Jun. 29, 1985; & JP-A-60 029 985 (Nippon Denki K.K.), Feb. 15, 1985.
Patent Abstracts of Japan, vol. 13, No. 478 (P-951) (3826) Oct. 30, 1989, JP-A-1-189047 (Victor Company of Japan, Ltd.) Jul. 28, 1989.

Primary Examiner—Joseph A. Popek
Attorney, Agent, or Firm—Lowe, Price, LeBlanc & Becker

[57] ABSTRACT

A device for recording information on a recording medium as an electrostatic pattern includes a first electrode provided on a surface of the recording medium; a second electrode provided a recording device; a discharging projection formed over the second electrode and projecting towards the recording medium; a field device for developing a an electric field between the first and second electrodes; and a modulator for modulating the electric field correspondingly with the information by discharge caused between the discharging projection and a surface of the recording medium.

12 Claims, 4 Drawing Sheets

ELECTROSTATIC LATENT IMAGE RECORDING/REPRODUCING DEVICE

BACKGROUND OF THE INVENTION

This invention relates to an electrostatic latent image recording device, an electrostatic latent image reproducing device, and an electrostatic latent image recording and reproducing device.

In one type of information recording and reproducing apparatus, a recording laser beam is incident to a photoconductive layer via a transparent electrode, and a recording medium includes an electrode which cooperates with the transparent electrode to apply an electric field to the photoconductive layer. The recording medium also includes a layer holding charges which are generated in correspondence with the electric field in the photoconductive layer. The electric field in the photoconductive layer is modulated in accordance with the recording laser beam which carries information to be recorded, so that a charge pattern corresponding to the information is formed on the charge holding layer of the recording medium. The charge pattern is read out from the recording medium by sensing an electric field generated on the basis of the charge pattern.

This type of previously-proposed information recording and reproducing apparatus has problems in the quality of recorded information and the recording density.

SUMMARY OF THE INVENTION

It is a first object of this invention to provide an excellent electrostatic latent image recording device.

It is a second object of this invention to provide an excellent electrostatic latent image reproducing device.

It is a third object of this invention to provide an excellent electrostatic latent image recording and reproducing device.

According to this invention, a device for recording information on a recording medium as an electrostatic pattern comprises:

a first electrode provided on a surface of the recording medium;

a second electrode provided on recording means;

discharging projection means formed over said second electrode for opposing the recording medium;

means developing a predetermined electric field between said first and second electrodes;

means modulating said predetermined electric field correspondingly with the information by discharge caused between said discharging projection means and a surface of the recording medium.

According to this invention, a device for recording and reproducing an electrostatic latent image on and from a recording medium comprising an insulation layer and a first electrode, comprises:

recording and reproducing means laminated with a second electrode, a photoconductive layer, and a photomodulation layer, said recording and reproducing means opposing the recording medium to scan thereof, means applicable a first electric field between the first and second electrodes, writing beam means modulated with information to be recorded as the electrostatic latent image, being incident to said recording and reproducing means to activate said photoconductive layer thereby said first electric field is modulated according to the information, generating said electrostatic latent image on the insulation layer, reading beam means passing through said photomodulation layer being subjected to a second electric field of said electrostatic latent image on the insulation layer, thereby said reading beam means is modulated according to the electrostatic latent image.

According to this invention, a device for reproducing an electrostatic latent image from a recording medium having an image track and reference tracks recorded with position reference signals, which extend along both sides of the image track, comprises:

a first electrode provided on a surface of the recording medium;

a reproducing member opposing the image and reference tracks comprising a pair of position sensing electrodes for generating tracking error signal dependent on a position of the reproducing member with respect to the reference tracks.

According to this invention, a device for recording an electrostatic latent image on a recording medium comprises:

recording means having position sensing electrode means opposing the recording medium for generating an error signal representative of a distance relative to the recording medium;

means for controlling the distance relative to the recording medium thereby distance between said recording means and said recording medium is controlled to be maintained.

Light is used in embodiments of this invention while this invention can use other electromagnetic radiation such as x-rays, gamma rays, or radio waves.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
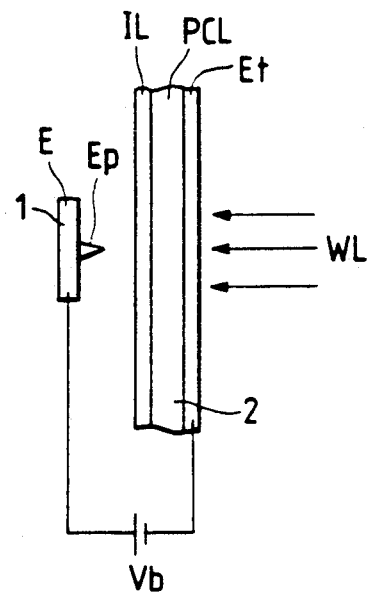
FIG. 1 is a diagram of an electrostatic latent image recording device according to a first embodiment of this invention.

With reference to FIG. 1, a recording element 1 functions to record an electrostatic latent image on a recording medium 2 by use of parallel writing light (rays) WL. The recording element 1 includes an electrode E formed with a discharging projection Ep which projects toward the recording medium 2. The recording medium 2 has a laminated structure composed of a transparent electrode Et, a photoconductive layer PCL, and a charge holding layer IL. The photoconductive layer PCL extends between the transparent electrode Et and the charge holding layer IL. The charge holding layer IL faces the recording element 1. The parallel writing light WL is incident to the photoconductive layer PCL via the transparent electrode Et.

The discharging projection Ep of the recording element 1 opposes the charge holding layer IL of the recording medium 2. The discharging projection Ep is separated from the charge holding layer IL. A dc power supply Vb is electrically connected between the electrode E of the recording element 1 and the transparent electrode Et of the recording medium 2 so that an electric field is developed between the electrodes E and Et. The photoconductive layer PCL of the recording medium 2 is exposed to the parallel electric field.

The writing light WL is modulated in accordance with information to be recorded. Since the impedance of the photoconductive layer PCL depends on the intensity of the incident writing light WL, the electric field between the recording element and the recording medium is varied or modulated correspondingly with the light intensity distribution of the information. The light intensity varies two dimensionally, along with the information distribution. A discharge occurs between the discharging projection Ep of the recording element 1 and the charge holding layer IL of the recording medium 2 so that charges are generated and held at a point of the charge holding layer IL which directly opposes the discharging projection Ep. Since the discharge depends on the field strength of the electric field, the amount of generated and held charges corresponds to the distribution of the information. When the recording element 1 is moved relative to the recording medium 2 so that the surface of the charge holding layer IL is two-dimensionally scanned by the discharging projection Ep, the information is recorded on the charge holding layer IL as a two-dimensional charge latent image (electrostatic charge pattern).

DESCRIPTION OF THE SECOND PREFERRED EMBODIMENT

Figure 2:
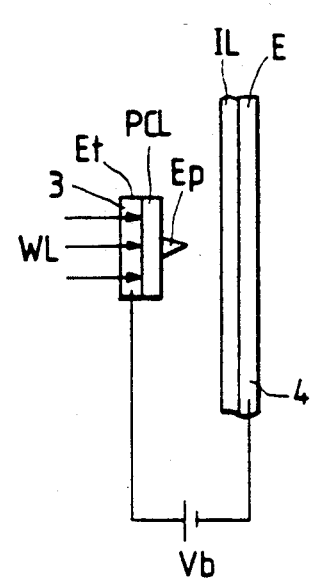
FIG. 2 is a diagram of an electrostatic latent image recording device according to a second embodiment of this invention.

With reference to FIG. 2, a recording element 3 functions to record an electrostatic latent image on a recording medium 4 by use of parallel writing light WL. The recording element 3 has a laminated structure composed of a transparent electrode Et and a photoconductive layer PCL. The photoconductive layer PCL opposes the recording medium 4. A discharging projection Ep is formed on the photoconductive layer PCL and projects toward the recording medium 4. The parallel writing light WL is incident to the photoconductive layer PCL via the transparent electrode Et. The recording medium 4 has a laminated structure composed of an electrode E and a charge holding layer IL. The charge holding layer IL opposes the recording element 3.

The discharging projection Ep of the recording element 3 projects toward the charge holding layer IL of the recording medium 4. The discharging projection Ep is separated from the charge holding layer IL. A dc power supply Vb is electrically connected between the transparent electrode Et of the recording element 3 and the electrode E of the recording medium 4 so that an electric field is developed between the electrodes Et and E. The photoconductive layer PCL of the recording element 3 is exposed to the parallel electric field.

The writing light WL is modulated in accordance with information to be recorded. Since the impedance of the photoconductive layer PCL depends on the intensity of the incident writing light WL, the electric field is varied or modulated correspondingly with the light intensity of the information. A discharge occurs between the discharging projection Ep of the recording element 3 and the charge holding layer IL of the recording medium 4 so that charges are generated and held at a point of the charge holding layer IL which directly opposes the discharging projection Ep. Since the discharge depends on the electric fields, the amount of generated and held charges corresponds to the light intensity of the information. When the recording element 3 is moved relative to the recording medium 4 so that the surface of the charge holding layer IL is two-dimensionally scanned by the discharging projection Ep, the information is recorded on the charge holding layer IL as a two-dimensional charge latent image.

DESCRIPTION OF THE THIRD PREFERRED EMBODIMENT

Figure 3:
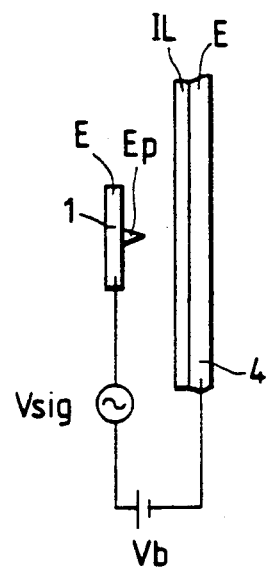
FIG. 3 is a diagram of an electrostatic latent image recording device according to a third embodiment of this invention.

With reference to FIG. 3, a recording element 1 functions to record an electrostatic latent image on a recording medium 4 by use of a signal voltage Vsig. The recording element 1 is similar to the recording element of FIG. 1. The recording medium 4 is similar to the recording medium of FIG. 2.

A dc power supply Vb is electrically connected between the electrode E of the recording element 1 and the electrode E of the recording medium 4 so that a parallel electric field is developed between the two electrodes E. The signal voltage Vsig is superimposed on the voltage of the dc power supply Vb so that the electric field varies in accordance with the signal voltage Vsig. Since the signal voltage Vsig varies in accordance with information to be recorded, the electric field is modulated in accordance with the information.

A discharge occurs between the discharging projection Ep of the recording element 1 and the charge holding layer IL of the recording medium 4 so that charges are generated and held at a point of the charge holding layer IL which directly opposes the discharging projection Ep. Since the discharge depends on the electric field, the amount of generated and held charges corresponds to the intensity of the information. When the recording element 1 is moved relative to the recording medium 4 so that the surface of the charge holding layer IL is two-dimensionally scanned by the discharging projection Ep, the information is recorded on the charge holding layer IL as a two-dimensional charge latent image.

In the first through third embodiments, the electrode E or Et is a plane of finite dimension confronting the charge holding layer and the projection Ep protrudes from the plane of the electrode E or Et as a limited part thereof.

DESCRIPTION OF THE FOURTH PREFERRED EMBODIMENT

Figure 4:
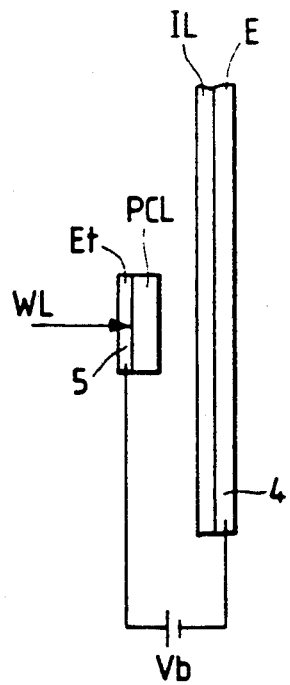
FIG. 4 is a diagram of an electrostatic latent image recording device according to a fourth embodiment of this invention.

FIG. 4 shows a fourth embodiment of this invention which is similar to the embodiment of FIG. 2 except for the following design changes. In the embodiment of FIG. 4, the discharging projection Ep (see FIG. 2) is omitted from a recording element 5. In addition, a narrow beam of writing light WL is incident to a photoconductive layer PCL of the recording element 5.

The point of the photoconductive layer PCL which receives the narrow beam of the writing light WL is different in impedance from the remaining part of the photoconductive layer PCL. A discharge occurs between the reduced impedance point of the recording element 5 and a charge holding layer IL of the recording medium 4. The discharge reflects the impedance variation caused by the incident beam of light WL in the photoconductive layer PCL. Accordingly, charges are generated correspondingly with the intensity of the writing light WL and are held at a point of the charge holding layer IL which directly opposes the light-receiving point of the photoconductive layer PCL. When the narrow beam of the writing light WL, of which the intensity is modulated according to the information to be recorded, is moved relative to the recording medium 4 so that the surface of the charge holding layer IL is two-dimensionally scanned, the information is thus recorded on the charge holding layer IL as a two-dimensional charge latent image.

DESCRIPTION OF THE FIFTH PREFERRED EMBODIMENT

Figure 5:
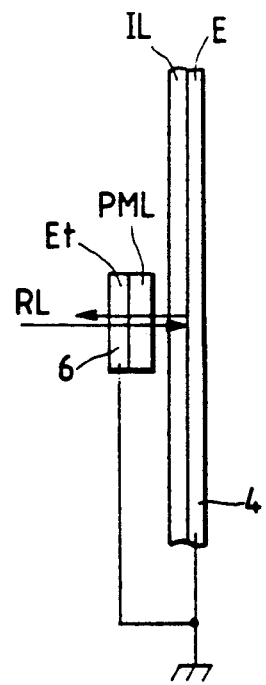
FIG. 5 is a diagram of an electrostatic latent image reproducing device according to a fifth embodiment of this invention.

With reference to FIG. 5, a reproducing element 6 functions to reproduce information of a charge latent image from a recording medium 4 by use of a narrow beam of reading light RL. The reproducing element 6 has a laminated structure composed of a transparent electrode Et and a photomodulation layer PML. The photomodulation layer PML opposes a charge holding layer IL of the recording medium 4. The photomodulation layer PML is separated from the charge holding layer IL. The recording medium 4 is similar to the recording medium of FIG. 2, but the charge holding layer IL is transparent or thin enough to allow the reading light RL passing therethrough and the electrode E is reflective to the reading light RL.

The transparent electrode Et of the reproducing element 6 and the electrode E of the recording medium 4 are electrically connected to each other and are thus at a common potential such as a ground potential.

After the narrow beam of the reading light RL passes in succession through the transparent electrode Et and the photomodulation layer PML of the reproducing element 6, thereafter the beam of the reading light RL enters the transparent charge holding layer IL and is reflected by the reflective electrode E of the recording medium 4. Then, the beam of the reading light RL passes back through the charge holding layer IL of the recording medium 4 and travels through the photomodulation layer PML and the transparent electrode Et of the reproducing element 6.

The photomodulation layer PML is exposed to the electric field dependent on the charge latent image on the charge holding layer IL of the recording medium 4. While the narrow beam of the reading light RL passes forward and backward through the photomodulation layer PML, the reading light RL is thus modulated in accordance with the field strength dependent on a point of the charge latent image which directly opposes the path of the narrow beam of the reading light RL in the photomodulation layer PML. Accordingly, the reading light RL carries a part of the information corresponding to the point hit by the reading light RL. When the narrow beam of the reading light RL is moved relative to the recording medium 4, so that the charge holding layer IL is two-dimensionally scanned by the beam of the reading light RL, the entire information corresponding to the scanned area, can be read out from the recording medium 4 with the reading light RL.

After the reading light RL exits from the reproducing element 6, the reading light RL passes through a wave plate (not shown) and an analyzer (not shown) and then enters a photo detector (not shown). The reading light RL is converted by the photo detector into a corresponding electric signal.

DESCRIPTION OF THE SIXTH PREFERRED EMBODIMENT

Figure 6:
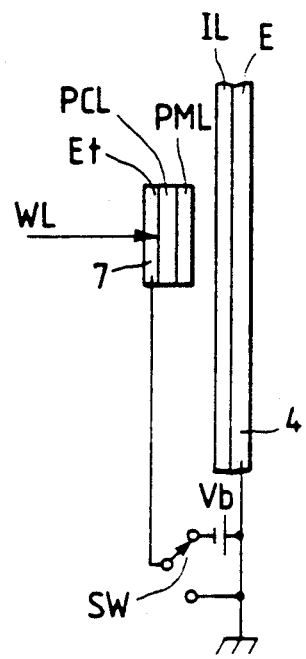
FIGS. 6 and 7 are diagrams of an electrostatic latent image recording and reproducing device according to a sixth embodiment of this invention.
Figure 7:
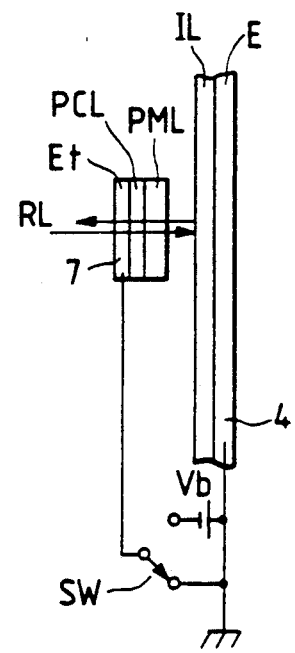

With reference to FIGS. 6 and 7, a recording and reproducing element 7 functions to record and reproduce information on and from a recording medium 4 by use of a narrow beam of writing light WL and a narrow beam of reading light RL. The recording and reproducing element 7 has a laminated structure composed of a transparent electrode Et, a photoconductive layer PCL, and a photomodulation layer PML. The photoconductive layer PCL extends between the transparent electrode Et and the photomodulation layer PML. The photomodulation layer PML of the recording and reproducing element 7 opposes a charge holding layer IL of the recording medium 4. The photomodulation layer PML is separated from the charge holding layer IL. The recording medium 4 is similar to the recording medium of FIG. 2.

A movable contact of a switch SW is electrically connected to the transparent electrode Et of the recording and reproducing element 7. A first fixed contact of the switch SW is electrically connected to a negative terminal of a dc power supply Vb. A second fixed contact of the switch SW and also a positive terminal of the dc power supply Vb are electrically connected to an electrode E of the recording medium 4 and grounded. The switch SW is operated between first and second positions. When the switch SW is in its first position, the movable contact is connected to the first fixed contact, and in its second position, the movable contact is connected to the second fixed contact.

During a recording mode of operation, the switch SW is in its first position so that the dc power supply Vb is connected between the transparent electrode Et of the element 7 and the electrode E of the recording medium 4 as shown in FIG. 6. In addition, the narrow beam of the writing light WL is incident to the photoconductive layer PCL via the transparent electrode Et of the element 7. During the recording mode of operation, the element 7 and the recording medium 4 operate similarly to the operation of the recording element and the recording medium of FIG. 4.

During a reproducing mode of operation, the switch SW is in its second position so that both of the transparent electrode Et of the element 7 and the electrode E of the recording medium 4 are subjected to the same ground potential as shown in FIG. 7. In addition, the narrow beam of the reading light RL is applied to the recording medium 4 through the element 7. During the reproducing mode of operation, the element 7 and the recording medium 4 operate similarly to the operation of the reproducing element and the recording medium of FIG. 5.

DESCRIPTION OF THE SEVENTH PREFERRED EMBODIMENT

Figure 8:
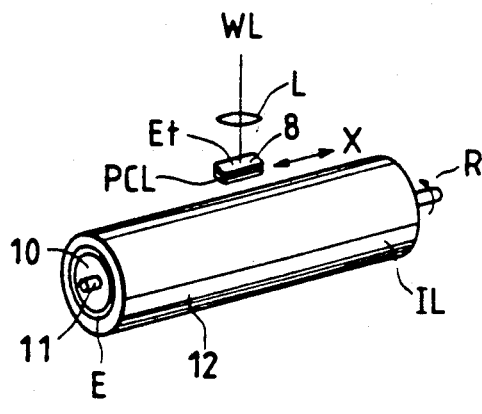
FIG. 8 is a diagram of an electrostatic latent image recording device according to a seventh embodiment of this invention.

FIG. 8 shows a seventh embodiment of this invention which is similar to the embodiment of FIG. 4 except for the following design changes. The embodiment of FIG. 8 is used in a printer.

In the embodiment of FIG. 8, writing light WL is focused on a photoconductive layer PCL of a recording element 8 by a lens L. A platten 10 rotates about a shaft 11 in a direction R. The circumferential surface of the platten 10 is coated with a lamination of an electrode E and a charge holding layer IL over the electrode E forming a recording medium 12. The charge holding layer IL is thus exposed to the recording element 8. The charge holding layer IL rotates circumferentially together with the platten 10. The recording element 8 opposes the charge holding layer IL of the recording medium 12. The writing light WL, the lens L, and the recording element 8 move linearly together along the shaft 11, i.e. in the directions X relative to the charge holding layer IL of the recording medium 12.

In operation, the writing light WL, the lens L, and the recording element 8 are moved linearly in the directions X while the charge holding layer IL is rotated circumferentially in the direction R. As a result, a two-dimensional charge latent image is formed on the charge holding layer IL of the recording medium 12 in accordance with information modulated in the writing light WL.

DESCRIPTION OF THE EIGHTH PREFERRED EMBODIMENT

Figure 9:
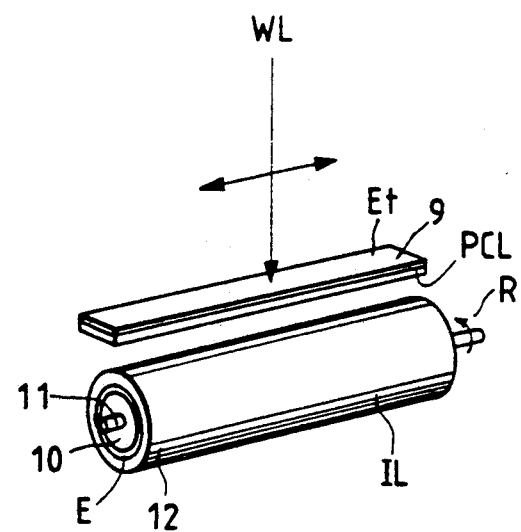
FIG. 9 is a diagram of an electrostatic latent image recording device according to an eighth embodiment of this invention.

FIG. 9 shows an eighth embodiment of this invention which is similar to the embodiment of FIG. 8 except for the following design changes. In the embodiment of FIG. 9, a recording element 9 is elongated but stationary so as to cover the whole axial dimension of a charge holding layer IL of a recording medium 12. During the operation, writing light WL scans the charge holding layer IL by moving along the shaft 11 while the recording medium 12 rotates in the direction R.

DESCRIPTION OF THE NINTH PREFERRED EMBODIMENT

Figure 10:
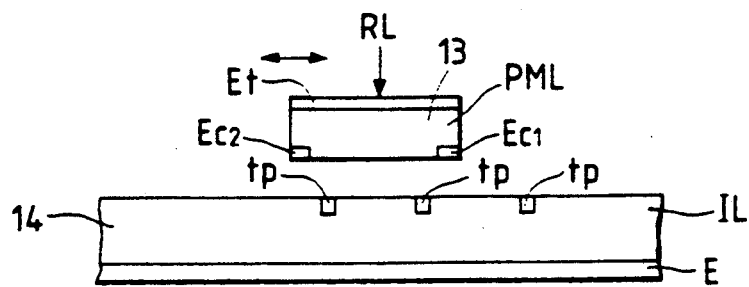
FIG. 10 is a sectional view of a recording medium and an electrostatic latent image reproducing device according to a ninth embodiment of this invention.
Figure 11:
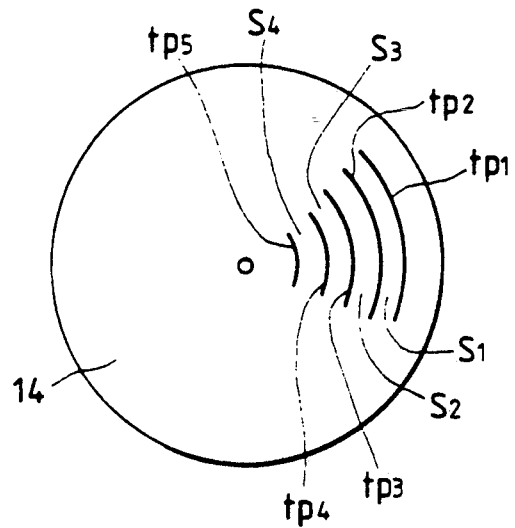
FIG. 11 is a plan view of the recording medium of FIG. 10.

FIGS. 10 and 11 show a ninth embodiment of this invention which is similar to the embodiment of FIG. 5 except for the following design changes. In the embodiment of FIGS. 10 and 11, a disc shaped recording medium 14 is shown in cross section cut along the radius of the recording medium, and a pair of position sensing electrodes Ec1 and Ec2 are provided on a photomodulation layer PML of a reproducing element 13 which opposes the disc-shaped recording medium 14 rotating about its center so that the reproducing element 13 moves circumferentially relative to the recording medium 14. The reproducing element 13 is movable radially as indicated by the double headed arrow for feeding and tracking, and also movable vertically relative to the recording medium 14 so that the distance between the reproducing element 13 and the recording medium 14 is controllable. A charge latent image is recorded along circumferential information recording tracks (image tracks) S1, S2, S3, . . . . Reference position signals are recorded along circumferential reference recording tracks tp1, tp2, tp3, . . . which extend along the sides of the information recording tracks S1, S2, S3, . . . . The reference recording tracks tp1, tp2, tp3, . . . are spaced at a predetermined equal pitch. It should be noted that, in FIG. 10, the reference recording tracks are denoted by the same character "tp". The position sensing electrodes Ec1 and Ec2 are separated from each other in a radial direction of the recording medium 14. The distance between the position sensing electrodes Ec1 and Ec2 is slightly greater than the pitch between adjacent reference recording tracks tp.

For example, the position reference signals are recorded on the reference recording tracks tp simultaneously with the recording of the information on the information recording tracks. The reference recording tracks tp may be replaced by reference position electrodes made of electrically conductive material which extend along the sides of the information recording tracks. In this case, guard bands are provided between the reference position electrodes and the information recording tracks.

When the reproducing element 13 assumes a correct tracking position with respect to an information recording track on the recording medium 14, the position sensing electrodes Ec1 and Ec2 and the reference recording tracks tp along the sides of the information recording track are in a symmetrical configuration so that substantially equal potentials are induced from the position sensing electrodes Ec1 and Ec2 respectively. As the reproducing element 13 offsets from the information recording track, the position sensing electrodes Ec1 and Ec2 and the reference recording tracks tp move out of the symmetrical configuration so that the potentials induced from the position sensing electrodes Ec1 and Ec2 become out of balance.

A subtracter (not shown) detects the difference between the output voltages from the position sensing electrodes Ec1 and Ec2, generating a tracking error signal. While the reproducing element 13 is moved circumferentially relative to the recording medium 14, the radial position of the reproducing element 13 relative to the recording medium 14 is controlled in accordance with the tracking error signal so as to nullify the difference between the output voltages from the position sensing electrodes Ec1 and Ec2. This tracking control enables the reproducing element 13 to accurately follow the information recording track on the recording medium 14.

An adder (not shown) adds the output voltages from the position sensing electrodes Ec1 and Ec2. A comparator (not shown) compares the output voltage from the adder with a reference voltage, generating an error signal depending on the distance between the reproducing element 13 and the recording medium 14. The distance is controlled in accordance with this error signal so that the distance between the reproducing element 13 and the recording medium 14 is maintained accurately.

DESCRIPTION OF THE TENTH PREFERRED EMBODIMENT

Figure 12:
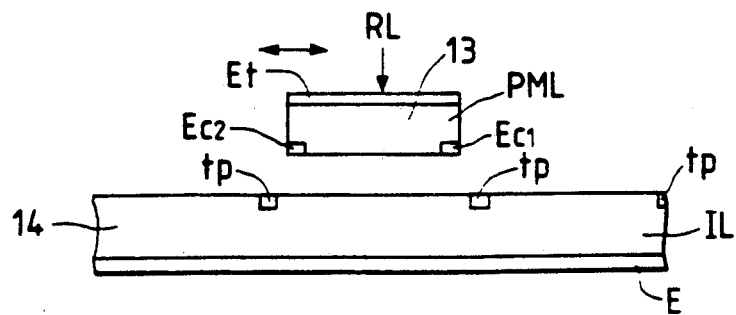
FIG. 12 is a sectional view of a recording medium and an electrostatic latent image reproducing device according to a tenth embodiment of this invention.

FIG. 12 shows a tenth embodiment of this invention which is similar to the embodiment of FIGS. 10 and 11 except that the distance between position sensing electrodes Ec1 and Ec2 on a reproducing element 13 is slightly smaller than the pitch of adjacent information recording tracks on a recording medium 14.

DESCRIPTION OF THE ELEVENTH PREFERRED EMBODIMENT

Figure 13:
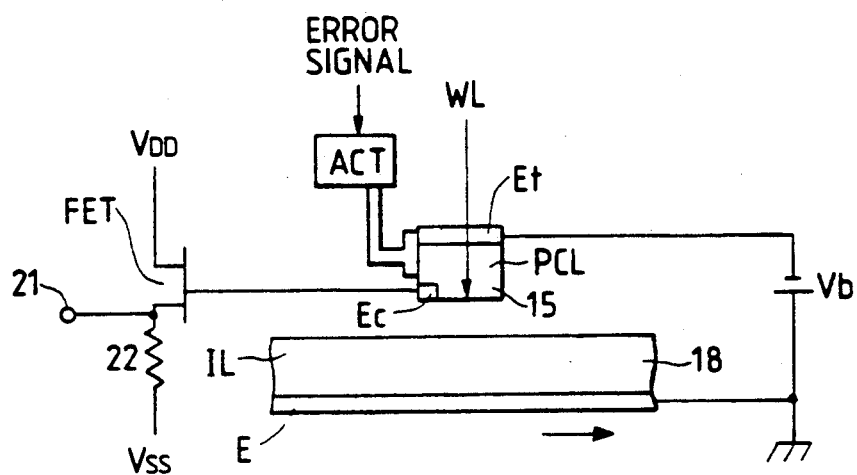
FIG. 13 is a diagram of an electrostatic latent image recording device according to an eleventh embodiment of this invention.

FIG. 13 shows an eleventh embodiment of this invention which is similar to the embodiment of FIG. 4 except for the following design changes. In the embodiment of FIG. 13, a position sensing electrode Ec is provided on a photoconductive layer PCL of a recording element 15. The position sensing electrode Ec is electrically connected to the gate of a field effect transistor FET. The drain of the transistor FET is connected to a power supply VDD. The source of the transistor FET is connected to a power supply Vss via a resistor 22, and is connected to a terminal 21. An actuator ACT mechanically connected to the recording element 15 functions to control the distance between the recording element 15 and a recording medium 18. An electrode E of the recording medium 18 is grounded.

A signal potential induced at the position sensing electrode Ec depends on the distance between the recording element 15 and the recording medium 18. The signal potential is transmitted from the position sensing electrode Ec to the terminal 21 via the transistor FET. A comparator (not shown) compares the signal voltage at the terminal 21 with a reference voltage, generating a position error signal. The actuator ACT adjusts the position of the recording element 15 relative to the recording medium 18 in accordance with the position error signal so that the distance between the recording element 15 and the recording element 18 is maintained with a correct distance.

DESCRIPTION OF THE TWELFTH PREFERRED EMBODIMENT

Figure 14:
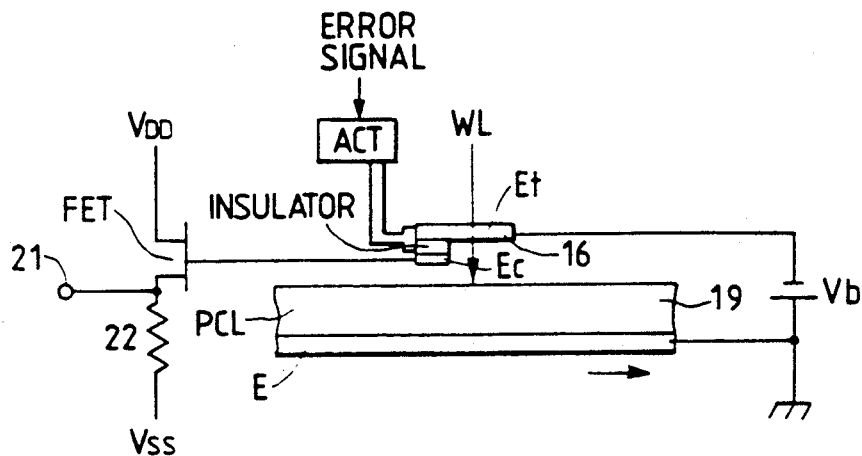
FIG. 14 is a diagram of an electrostatic latent image recording device according to a twelfth embodiment of this invention.

FIG. 14 shows a twelfth embodiment of this invention which is similar to the embodiment of FIG. 13 except for the following design changes. In the embodiment of FIG. 14, a recording element 16 has a transparent electrode Et and a position sensing electrode Ec mounted on the transparent electrode Et with an insulator therebetween. A recording medium 19 has a laminated structure of a photoconductive layer PCL and an electrode E. The recording element 16 opposes the photoconductive layer PCL of the recording medium 19. The photoconductive layer PCL holds an electrostatic latent image thereon.

DESCRIPTION OF THE THIRTEENTH PREFERRED EMBODIMENT

Figure 15:
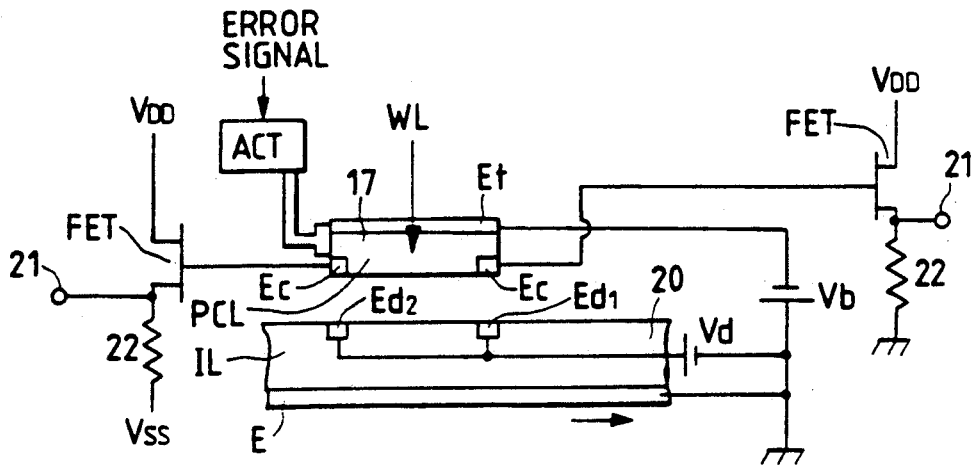
FIG. 15 is a diagram of an electrostatic latent image recording device according to a thirteenth embodiment of this invention.

FIG. 15 shows a thirteenth embodiment of this invention which is similar to the embodiment of FIG. 13 except for the following design changes. The embodiment of FIG. 15 includes two similar combinations each having a position sensing electrode Ec, a field effect transistor FET, a resistor 22, and a terminal 21. The output signals from the two combinations are used for generating a position error signal applied to an actuator ACT. A recording medium 20 is provided with position controlling electrodes Ed1 and Ed2 corresponding to the position sensing electrodes Ec of the recording element 17. The positive terminal of a dc power supply Vd is electrically connected to the position controlling electrodes Ed1 and Ed2. The negative terminal of the dc power supply Vd is electrically connected to the positive terminal of a dc power supply Vb. The negative terminal of the dc power supply Vb is electrically connected to the transparent electrode Et of the reading element 17. The position controlling electrodes Ed1 and Ed2 enable the induced potentials at the position sensing electrodes Ec to accurately and reliably represent the distance between the recording element 17 and the recording medium 20.

It should be noted that a construction of the actuator ACT in FIGS. 13 to 15 may be conventional one such as one usually found with an optical head in Compact Disc players. Whereas, tracking systems applicable to the embodiments of FIGS. 13 to 15 may also be conventional, one of such is disclosed in U.S. Pat. No. 4,331,976, "High Density Recording System using side-by-side Information and Serve Track" issued to the applicant of the present invention. Further, in all the embodiments, the writing or reading light may not necessarily be a visible light, but it can be any kind of electromagnetic radiation beam to which the photoconductive layer PCL or the photomodulation layer PML is responsive.

WHAT IS CLAIMED IS:

1. A device for recording information on a recording medium as an electrostatic pattern, comprising:
   a first electrode provided on a surface of the recording medium;
   recording means;
   said recording means including a second electrode provided thereon;
   discharging projection means formed over said second electrode and projecting towards the recording medium;
   means for developing a predetermined electric field between said first and second electrodes; and
   modulating means for modulating said predetermined electric field in accordance with the information in such a manner that discharge occurs between said discharging projection means and the recording medium.

2. A device for recording and reproducing an electrostatic latent image on and from a recording medium comprising an insulation layer and a first electrode, said device comprising:
   recording and reproducing means laminated with a second electrode, a photoconductive layer, and a photomodulation layer, said recording and reproducing means facing the recording medium to scan the recording medium,
   means for applying a first electric field between the first and second electrodes,
   writing beam means modulated with information to be recorded as the electrostatic latent image, said writing beam means being incident on said recording and reproducing means to activate said photoconductive layer thereby modulating said first electric field according to the information to generate said electrostatic latent image on the insulation layer,
   reading beam means passing through said photomodulation layer being subjected to a second electric field generated by said electrostatic latent image on the insulation layer, thereby said reading beam means is modulated according to the electrostatic latent image.

3. A device for reproducing an electrostatic latent image from a recording medium having an image track and reference tracks recorded with position reference signals, which extend along both sides of the image track, the device comprising:
- a first electrode provided on a surface of the recording medium;
- a reproducing member facing the image and reference tracks comprising a pair of position sensing electrodes for generating tracking error signal dependent on a position of the reproducing member with respect to the reference tracks.

4. A device of claim 3 wherein the position sensing electrodes are separated by a distance different from a pitch between two adjacent reference tracks.

5. A device for recording an electrostatic latent image on a recording medium, comprising:
- recording means having position sensing electrode means facing the recording medium and separated therefrom by a relative distance, said sensing electrode means generating an error signal representative of the distance relative to the recording medium;
- means for controlling the relative distance and thereby maintaining substantially constant a distance between said recording means and said recording medium.

6. A device of claim 1 wherein said modulating means comprises a photoconductive layer member disposed between said first and second electrodes, and
- electromagnetic radiation means modulated correspondingly with said information for irradiating said photoconductive layer member.

7. A device of claim 6 wherein said recording medium further comprising an insulation layer for holding said electrostatic pattern, and said photoconductive layer member is laminated between the insulation layer and the first electrode, and wherein said electromagnetic radiation means irradiates said recording medium through said first electrode which is transparent to the electromagnetic radiation means.

8. A device of claim 6 wherein said recording medium further comprising an insulation layer for holding said electrostatic pattern, and said recording means further comprising said photoconductive layer member laminated to said second electrode and said discharging projection means being provided on the photoconductive layer member, and wherein said electromagnetic radiation means irradiates said recording means through said second electrode which is transparent to the electromagnetic radiation means.

9. A device of claim 1 wherein said modulating means comprises source means generating a signal modulated in accordance with said information and superimposed on said predetermined electric field, thereby to modulate said predetermined electric field.

10. A device of claim 1 wherein said recording means comprises a photoconductive layer illuminated in accordance with the information for varying the discharge by said discharge projection means.

11. A device of claim 2 wherein said writing beam means illuminates the photoconductive layer of said recording and reproducing means for generating said electrostatic latent image.

12. A device for recording information on a recording medium, comprising:
- a first electrode provided on the recording medium;
- a second electrode spaced from the first electrode and projecting toward the recording medium;
- means for developing an electric field between the first and second electrodes;
- means for modulating the electric field in accordance with the information;
- means for condensing the modulated electric field, including a discharge member disposed between the first electrode and the recording medium and having a sharp distal end which extends toward the recording medium and which is spaced from the recording medium, the discharge member condensing the electric field; and
- means for generating an information-representative discharge between the discharge member and the recording medium in response to the modulated electric field to form an electrostatic mark on a local area of the recording medium which directly faces the distal end of the discharge member, wherein responsiveness of the discharge to the modulated electric field causes the discharge to represent the information and thus causes the electrostatic mark to correspond to the information.

* * * * *